United States Patent
Badry

(10) Patent No.: US 6,264,554 B1
(45) Date of Patent: Jul. 24, 2001

(54) VERTICAL CROP CUTTING APPARATUS

(76) Inventor: Merlin Badry, Box 667, Forestburg, Alberta (CA), T0B 1N0

( * ) Notice: Subject to any disclaimer, the term of this patent is extended or adjusted under 35 U.S.C. 154(b) by 0 days.

(21) Appl. No.: 09/427,715

(22) Filed: Oct. 27, 1999

(51) Int. Cl.[7] .................................................. A01D 15/24

(52) U.S. Cl. ............................................. 460/131; 56/157

(58) Field of Search ........................... 56/157, 256, 255; 460/131

(56) References Cited

U.S. PATENT DOCUMENTS 2,517,390 * 8/1950 Downing ................................. 56/157

OTHER PUBLICATIONS

Glendale Swath Dividers Advertisement 1 page only—No date.

Keer Shear—Operators Manual Jun. 1997.

* cited by examiner

*Primary Examiner*—Robert E. Pezzuto
(74) *Attorney, Agent, or Firm*—Adrian D. Battison

(57) ABSTRACT

A cutter is provided for attachment to each end of a horizontally extending agricultural cutting bar. Each cutter includes a rotor having blades mounted about a periphery thereof for rotation about a horizontal rotor axis extending between the cutters. The rotor is driven by a hydraulic motor such that the blades engage the crop at high speed. The cutting apparatus cuts in a vertical direction for use in cutting entangled crops such as canola and peas and preventing the crop from being entangled on the ends of the cutting bar.

20 Claims, 4 Drawing Sheets

VERTICAL CROP CUTTING APPARATUS

FIELD OF THE INVENTION

This invention relates crop cutting apparatus for attachment to an agricultural cutting bar and more particularly to a crop cutting apparatus which is oriented to cut along a generally vertical plane at respective ends of the cutting bar.

BACKGROUND

When cutting entangled crops such as canola, peas or mustard it is common for the crop to gather on respective ends of the header of a swather or combine unless a further cutting apparatus is mounted on the ends of the header. The entangled crops also tend to plug the header or form entangled piles in the swath in the case of a swather. The entangled piles then plug the combine which later collects the swath.

Known crop cutting devices arranged to mount on respective ends of a header for cutting along a generally vertical plane are generally quite complex. These generally include devices having a plurality of sickle sections mounted on a chain drive or a plurality of reciprocating blades. In either case, the devices include numerous moving parts and thus require a significant amount of maintenance as well as being costly to manufacture.

SUMMARY

According to the present invention there is provided a cutting apparatus for attachment to an end of a generally horizontally extending agricultural cutting bar, the cutting bar being supported for forward movement across the ground in a working direction extending transversely to the cutting bar for cutting a crop as the cutting bar is displaced in the working direction, said apparatus comprising:
- a housing arranged to mount on the end of the cutting bar;
- a rotor rotatably mounted within the housing for rotation about a substantially horizontal rotor axis, the rotor axis extending transversely to the forward direction;
- a plurality of blades mounted on a periphery of the rotor for engaging the crop as the rotor is rotated.

The use of a rotor having blades mounted thereon results in a cutting apparatus having very few moving parts which is simple and low in cost to manufacture as well as maintain. Mounting the blades on the rotor permits the blades to be rotated at very high speeds for enhancing the blade life and further reducing maintenance costs. Furthermore, the housing is easily adaptable for mounting on a header of either a combine or a swather such that the apparatus is useful with numerous types of agricultural cutting devices.

Preferably there is provided a hydraulic motor mounted on the housing for driving rotation of the rotor. The motor is preferably balanced about the rotor axis such that the rotor is mounted on an output shaft extending from the motor along the rotor axis. When the motor is mounted on an outer face of the housing, preferably there is provided a crop deflector bar mounted on the housing to extend laterally outward at a rearward incline from a front end of the housing such that the crop deflector bar deflects a crop away from the motor as the cutting bar is displaced through the crop in the working direction.

When there is provided a reel mounted above the cutting bar for rotation about a reel axis, preferably the rotor is driven by a rotor motor coupled to operate in series with a reel motor driving the reel.

Preferably the blades are equally spaced about the periphery of the rotor such that the rotor is weight balanced about the rotor axis.

The blades are preferably selectively separable from the rotor such that the blades may be replaced.

There may be provided an access port in the housing such that fasteners mounting the blades on the rotor are accessible without removing the rotor from the housing such that the blades are replaceable independently from the rotor.

A plurality of stationary blades are preferably mounted on a forward edge of the housing. The stationary blades are preferably spaced radially outward from the rotor axis in alignment with the blades mounted on the rotor such that the blades mounted on the rotor rotate past the stationary blades in a scissors cutting action.

When the rotor is mounted adjacent an inner face of the housing, a guard member is preferably mounted on the inner face of the housing to extend over the rotor such that the rotor is located between the housing and the guard member and the rotor extends past a forward edge of both the housing and the guard member.

The rotor is preferably mounted such that a forward edge of the rotor extends forward from the cutting bar.

A bracket may be provided for mounting the housing to the cutting bar. The bracket preferably includes a first mounting member arranged to mount the housing thereon and a second mounting member arranged to mount on the cutting bar, the first and second mounting members being coupled together for relative pivotal movement therebetween such that an angle between the housing and the cutting bar is adjustable. Preferably the bracket further includes a plurality of mounting apertures being vertically spaced apart thereon for mounting the housing such that a vertical spacing between the housing and the cutting bar is adjustable.

A crop collecting member is preferably mounted on the housing to extend forwardly at an upward incline therefrom, the crop collecting member being arranged to engage the crop and direct the crop downward towards the rotor as the cutting bar is displaced in the working direction.

A cover member may be arranged to mount on the housing to extend forward past the blades such that the blades are prevented from engaging the crop, the cover being selectively separable from the housing for use of the rotor such that the removal of the housing from the cutting bar is not required if the rotor is not to be used.

The housing may be symmetrical about a horizontal plane extending through the rotor axis such that inverting the housing about rotor axis allows the housing to be mounted on an opposite end of the cutting bar.

There may be provided a housing having a corresponding rotor and blades coupled thereto mounted at each end of the cutting bar.

Preferably the rotor axis is substantially parallel to the cutting bar.

BRIEF DESCRIPTION OF THE DRAWINGS

In the accompanying drawings, which illustrate an exemplary embodiment of the present invention.

DETAILED DESCRIPTION

Figure 1:
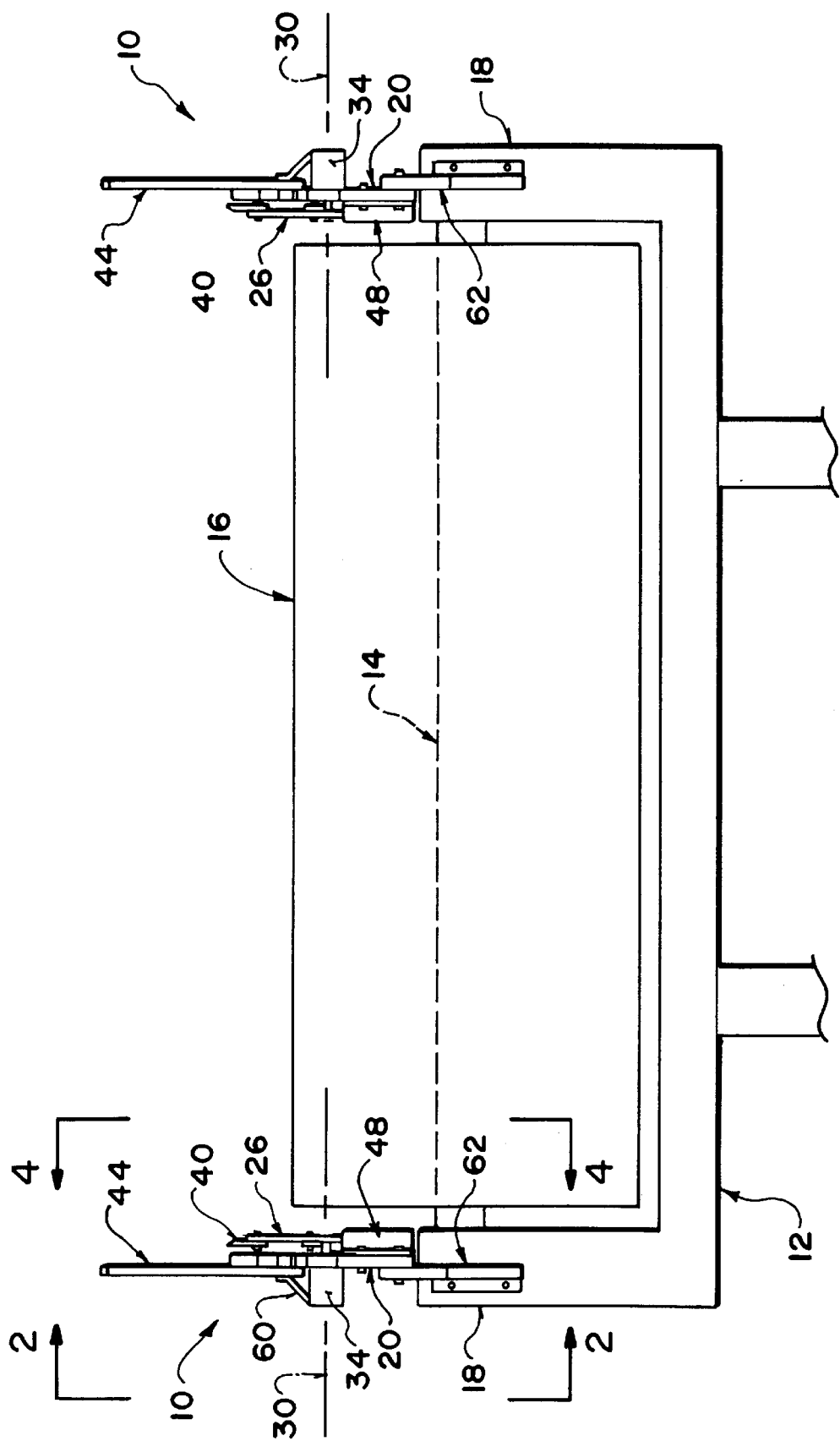
FIG. 1 is a top plan view of the cutter mounted at each end of a header attachment with the cover member removed.
Figure 2:
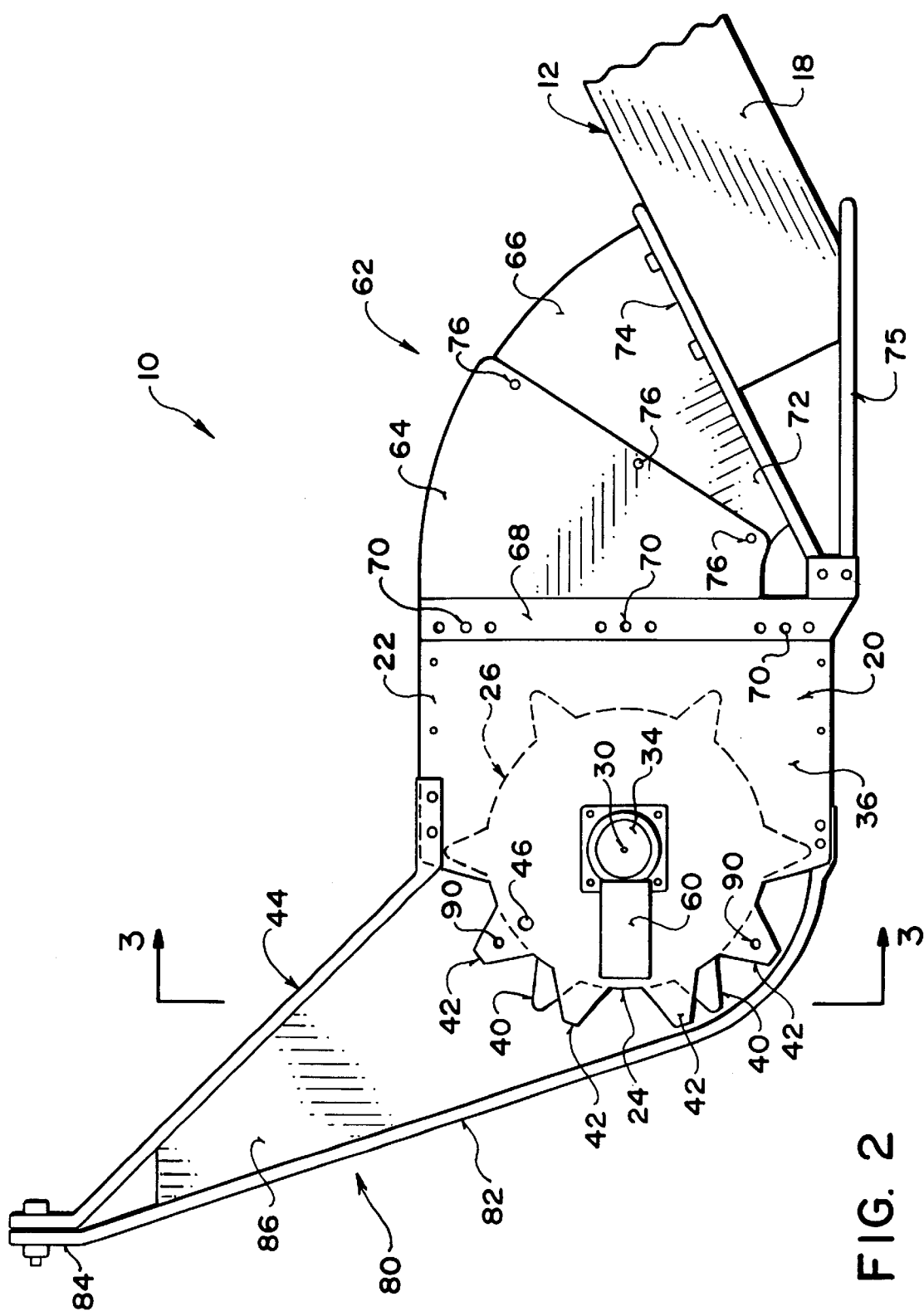
FIG. 2 is a side elevational view along the line 2—2 of FIG. 1 with the cover member mounted thereon.
Figure 3:
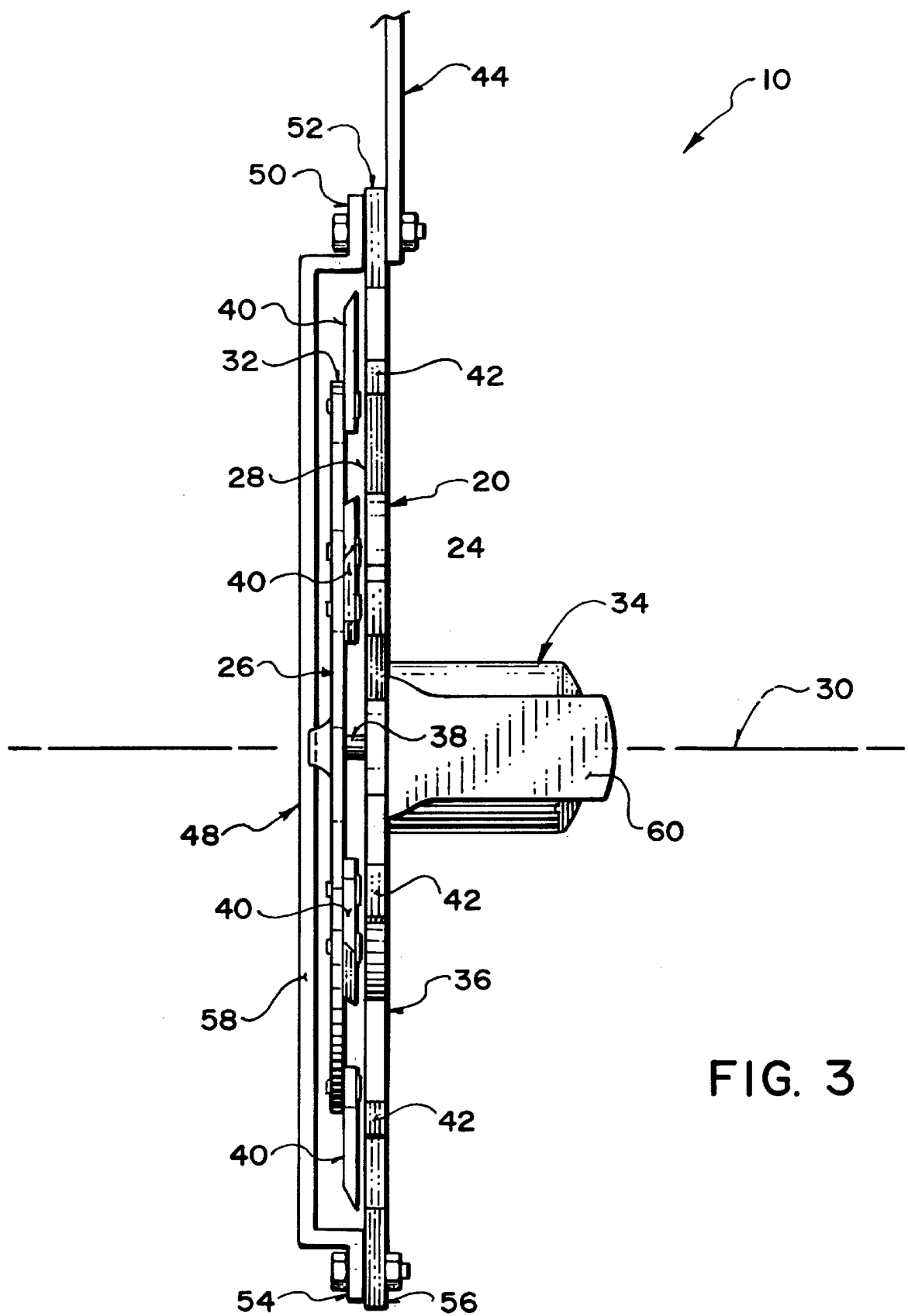
FIG. 3 is a front elevational view along the line 3—3 of FIG. 2 with the cover member removed.

Referring to the accompanying drawings, there is illustrated a cutter attachment 10 for use on a header 12 of a swather or combine. The header 12 includes an agricultural cutting bar 14 which extends generally horizontally across the ground for forward movement in a working direction which extends transversely to the cutting bar. A reel 16 is mounted above the cuffing bar 14 for advancing the crop into the cutting bar for cutting the crop as the header is moved forwardly in the working direction. The cutter attachment 10 mounts at each end 18 of the header for cutting in a generally vertical direction for preventing build up of crop such as canola and peas on respective ends of the header.

The cutter attachment include a housing 20 which comprises a generally upright plate 22 which is rectangular in shape. A forward edge 24 of the plate extends forward, having a semi-circular contour. A rotor 26 is mounted adjacent an inner face 28 of the housing. The rotor 26 is mounted for rotation about a rotor axis 30. The rotor axis extends horizontally and parallel to the cutting bar such that a periphery 32 of the rotor is substantially in alignment with the forward edge 24 of the housing.

A hydraulic orbit motor 34 is mounted on an outer face 36 of the housing. The motor 34 is centred about the rotor axis 30 such that an output shaft 38 of the motor mounts the rotor thereon. The motor 34 is coupled to operate in series with a reel motor for driving the reel such that the rotor only operates when the reel is rotating. This arrangement provide an added safety precaution as the hydraulic motor is known to operate very quietly.

The motor 34 is arranged to operate effectively at speeds as low as 50 to 150 revolutions per minute as well as speeds as high as 1000 revolutions per minute. Under normal operation however the rotor is arranged to rotate at approximately 400 revolutions per minute. The power output required of the motor is in the range of 0.3 to 1 horsepower. This corresponds to a hydraulic oil flow of approximately 5 gallons per minute to the motor 34.

The rotor 26 is a circular plate having a set of six blades 40 bolted about the periphery 32 of the rotor. Bolting the blades 40 to the disc allows the blades to be removed for replacement as the blades wear. The blades 40 are equally spaced circumferentially about the periphery of the rotor such that the rotor is weight balanced about the rotor axis 30. The blades 40 are arranged to extend forwardly past the cutting bar along a forward edge of the rotor.

The forward edge 24 of the housing includes a plurality of stationary blades 42 which are radially spaced from the rotor axis to a distance equal to that of the rotor blades 40. As the rotor blades 40 are rotated past the stationary blades 42 the resulting cutting action is scissor like to further improve the cutting action of the blades 40.

Figure 4:
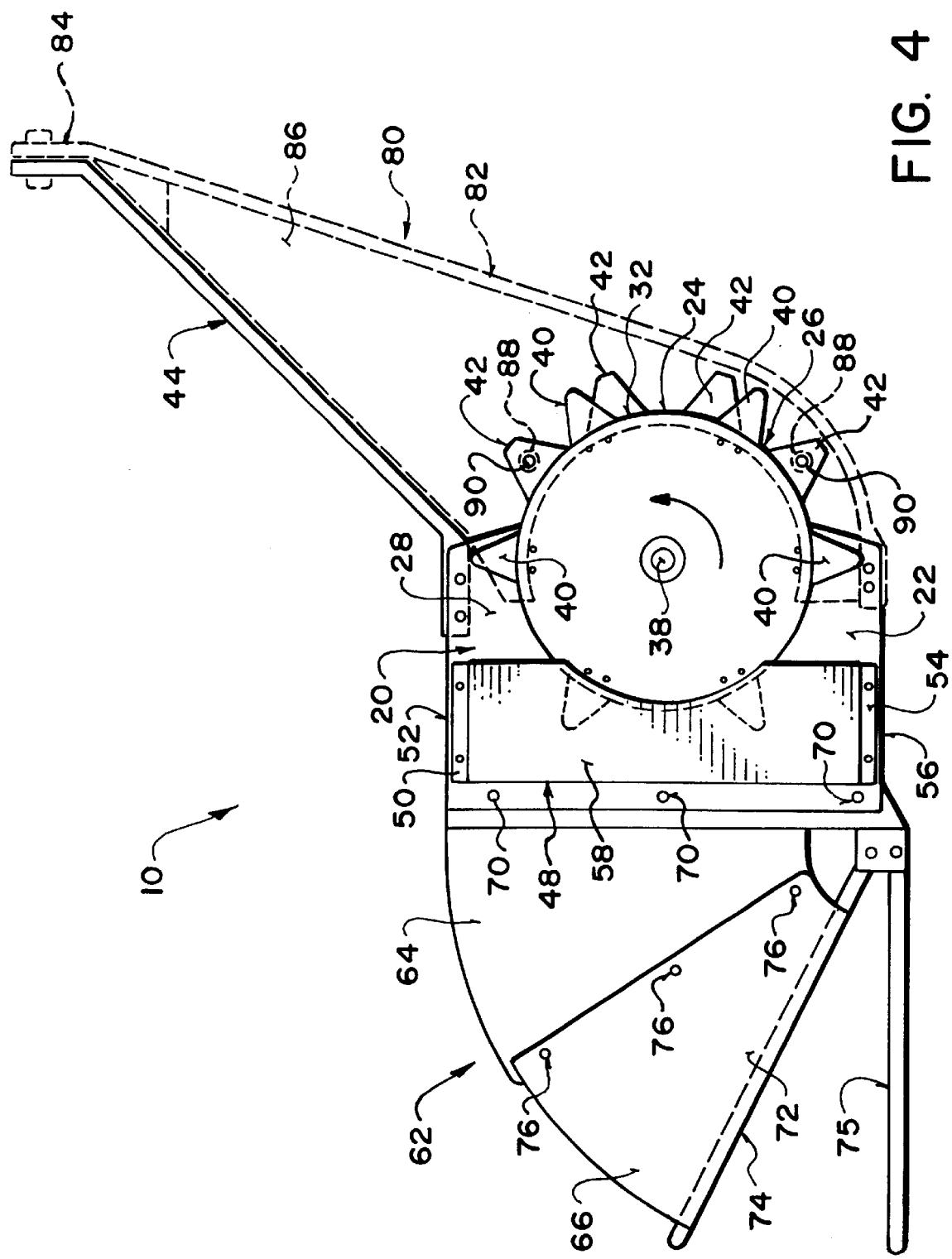
FIG. 4 is a side elevational view along the line 4—4 of FIG. 1.

A collecting member 44 in the form of an elongate rod is mounted on the outer face 36 of the housing such that the rod extends forwardly at an upward incline from the housing. In this arrangement the collecting member is arranged to deflect the crop downwardly into the blades 40 and 42 as the header is advanced forwardly through the crop in the working direction. The rotor 26 is arranged to rotate in a counter clockwise direction as seen in FIG. 4. As the rotor 26 rotates the crop is deflected upward into the collecting member 44 instead of permitting the crop to deflect under the housing to ensure that the crop is thoroughly cut in the vertical direction at each end 18 of the header.

The housing 20 is symmetrical about a horizontal plane including the rotor axis 30 such that the housing may be inverted about the rotor axis for mounting on either end of the header. A port 46 is provided in the outer face 36 of the housing in alignment with the periphery 32 of the rotor such that the bolts which secure the blades onto the rotor are accessible from the outer face of the housing.

A guard member 48 is mounted on the inner face 28 of the housing to extend over the rotor 26 such that the rotor is partially enclosed within the housing. The guard member includes an upper mounting flange 50 for securing to the housing adjacent a top end 52 of the housing. A lower mounting flange 54 is provided on the guard member for securing to the housing at a bottom end 56 of the housing. A rectangular plate 55 extends between the upper and lower mounting flanges spaced from the inner face 28 of the housing such that the rotor rotates between the guard member 48 and the inner face of the housing. The guard member 48 is spaced rearwardly from the rotor axis 30 such that only a rearward portion of the rotor is covered by the guard member.

A crop deflector bar 60 is mounted on the outer face 36 of the housing. The deflector bar 60 extends rearward at an outward incline from a forward end of the housing to extend over the motor 34. In this arrangement the crop is deflected away from the motor 34 as the header is advanced through the crop in the working direction.

A bracket 62 is provided for mounting the housing onto the respective ends 18 of the header. The bracket 62 includes a first mounting member 64 and a second mounting member 66 which are pivotally coupled together. An outer end 68 of the first mounting member 64 includes a plurality of mounting apertures 70 for mounting the housing 20 thereon. The mounting apertures 70 are vertically spaced apart such that a relative height between the housing and the first mounting member is adjustable by mounting the housing on different apertures. An outer end 72 of the second mounting member 66 includes a mounting flange 74 mounted at right angles thereto for mounting to the end of the header. A lower support arm 75 is pivotally coupled to the second mounting member 66 for mounting on the header for added structural support.

The first and second mounting members 64 and 66 are arcuate shaped plates which are slidably mounted one adjacent to the other. Sliding the mounting members relative to each other will adjust a relative angle between the respective outer ends of the mounting members. Fasteners 76 are provided for securing the relative orientation of the mounting members 64 and 66. The bracket 62 is thus arranged to mount the housing 20 onto a corresponding end 18 of the header such that a height and angle of the housing relative to the end of the header is adjustable.

A cover member 80 is provided for mounting over the rotor when it is not desirable for the rotor to be used. The cover member 80 includes a rod like member 82 which mounts adjacent the bottom end of the housing to extend outwardly and upwardly therefrom. The rod member 82 curves outwardly past the periphery of the blades 40 and 42 and then curves upwardly to mount at an outer free end 84 on an end of the collecting member 44. The cover member 80 further includes a plate like member 86 which extends across an inner face of the rotor end blades. When the cover member 80 is mounted on the housing 20 the crop is prevented from engaging the blades 40 and 42. Thus if use of the rotor 26 is not desired installation of the cover member 80 allows the header 12 to be used without requiring removal of the housing 20 from the header. Once it is desired to make use of the cutter attachment 10 the cover member 80 from each cutter attachment is removed and the rotor 26 is permitted to rotate freely such that the blades 40 and 42 engage the crop as the header is advanced through the crop in the working direction.

A pair of mounting apertures 88 are located in the cover member 80 in alignment with mounting apertures 90 in the stationary blades 42 of the housing. A pair of rods may thus be mounted between respective co-operating apertures 80 and 90 to ensure that the rotor 26 is prevented from rotating when the cover member is mounted on the housing as an added safety precaution.

While one embodiment of the present invention has been described in the foregoing, it is to be understood that other embodiments are possible within the scope of the invention. The invention is to be considered limited solely by the scope of the appended claims.

What is claimed is:

1. A cutting apparatus for attachment to an end of a header which includes a generally horizontally extending agricultural cutting mechanism supported on the header for movement across the ground in a forward working direction extending transversely to the cutting mechanism for cutting a crop as the header is displaced in the forward working direction, said apparatus comprising:

a rotor arranged to be supported on the end of the header for rotation about a substantially horizontal rotor axis which extends transversely to the forward direction;

a plurality of rotor blades mounted on a periphery of the rotor for engaging the crop as the rotor is rotated;

a housing arranged to rotatable mount the rotor thereon and support the rotor on the header, the housing having a forward edge which is curved about the rotor axis; and a plurality of stationary members extending outwardly from the forward edge of the housing which is curved about the rotor axis, the stationary members being spaced radially from the rotor axis so as to be substantially in alignment with the rotor blades mounted on the rotor such that the crop is cut by the rotor blades as the rotor blades are rotated past the stationary members.

2. The apparatus according claim 1 wherein the stationary members are positioned on one side only of the rotor such that an opposing side of the rotor blades opposite the stationary members remains exposed as the rotor blades are rotated past the stationary members.

3. The apparatus according to claim 1 wherein there is provided a hydraulic motor mounted on the housing for driving rotation of the rotor, the motor being balanced about the rotor axis and being mounted on an output shaft extending from the motor along the rotor axis.

4. The apparatus according to claim 3 wherein the motor is mounted on an outer face of the housing and wherein there is provided a crop deflector bar mounted on the housing to extend laterally outward at a rearward incline from a front end of the housing such that the crop deflector bar deflects a crop away from the motor as the header is displaced through the crop in the working direction.

5. The apparatus according to claim 1 wherein there is provided a reel mounted on the header for rotation about a reel axis, the rotor being driven by a rotor motor coupled to operate in series with a reel motor driving the reel.

6. The apparatus according to claim 1 wherein the blades of the rotor are equally spaced about the periphery of the rotor such that the rotor is weight balanced about the rotor axis.

7. The apparatus according to claim 1 wherein the blades are selectively separable from the rotor such that the blades may be replaced with replacement blades having a similar configuration.

8. The apparatus according to claim 1 wherein there is provided an access port in the housing such that fasteners mounting the blades on the rotor are accessible without removing the rotor from the housing such that the blades of the rotor are replaceable independently from the rotor.

9. The apparatus according to claim 7 wherein the blades are mounted on the rotor by threaded fasteners.

10. The apparatus according to claim 1 wherein there is provided a mounting member arranged to mount on one end of the header in a first mounting position and on an opposite end of the header in a second alternative mounting position for supporting the housing thereon and mounting means arranged to mount the housing on the mounting member in the first mounting position and mount the housing on the mounting member in the second mounting position in which the housing is inverted about the rotor axis in relation to the first mounting position.

11. The apparatus according to claim 1 wherein there is provided a guard member mounted across an inner side of the rotor, the guard member having a forward edge spaced rearwardly from a forward edge of the rotor, such that a forward portion of the inner side of the rotor remains exposed.

12. The apparatus according to claim 1 wherein the rotor is mounted such that a forward edge of the rotor extends forward from the cutting mechanism.

13. The apparatus according to claim 1 wherein there is provided a cover member arranged to selectively mount on the housing to extend forward past the blades such that the blades are prevented from engaging the crop, the cover having a forward edge which is curved to extend forwardly and upwardly from a bottom end thereof to deflect the crop downwardly and away from the rotor.

14. The apparatus according to claim 1 wherein there is provided a crop collecting member mounted on the housing to extend forwardly at an upward incline therefrom, the crop collecting member being arranged to engage the crop and direct the crop downward towards the rotor as the header is displaced in the working direction.

15. A cutting apparatus for attachment to an end of a header which includes a generally horizontally extending agricultural cutting mechanism supported on the header for movement across the ground in a forward direction extending transversely to the cutting mechanism for cutting a crop as the header is displaced in the forward direction, said apparatus comprising:

a rotor arranged to be supported on the end of the header for rotation about a substantially horizontal rotor axis which extends transversely to the forward direction;

a plurality of rotor blades mounted on a periphery of the rotor for engaging the crop as the rotor is rotated;

a housing arranged to rotatably mount the rotor thereon and support the rotor on the header;

at least one stationary member extending outwardly from a forward edge of the housing, the stationary member being spaced radially from the rotor axis so as to be substantially in alignment with the rotor blades mounted on the rotor such that the crop is cut by the rotor blades as the rotor blades are rotated past the stationary member;

a mounting member arranged to mount on one end of the header in a first mounting position and on an opposite end of the header in a second alternative mounting position for supporting the housing thereon; and housing mounts arranged to mount the housing on the mounting member in the first mounting position and mount the housing on the mounting member in the second alternative mounting position in which the housing is inverted about the rotor axis in relation to the first mounting position.

16. The apparatus according to claim 15 wherein the mounting member includes a first mounting member arranged to mount the housing thereon and a second mounting member arranged to mount on the header, the first and second mounting members being coupled together for relative pivotal movement therebetween such that an angle between the housing and the header is adjustable.

17. The apparatus according to claim 15 wherein the housing mounts are located on the housing.

18. The apparatus according to claim 17 wherein the housing mounts are symmetrical about a horizontal plane extending through the rotor axis such that inverting the housing about rotor axis allows the housing to be mounted on an opposite end of the header.

19. A cutting apparatus for attachment to an end of a header which includes a generally horizontally extending agricultural cutting mechanism supported on the header for movement across the ground in a forward direction extending transversely to the cutting mechanism for cutting a crop as the header is displaced in the forward direction, said apparatus comprising:

a rotor arranged to be supported on the end of the header for rotation about a substantially horizontal rotor axis which extends transversely to the forward direction;

a plurality of rotor blades mounted on a periphery of the rotor for engaging the crop as the rotor is rotated;

a housing arranged to rotatably mount the rotor therein and support the rotor on the header; and a plurality of stationary members extending outward from a forward edge of the housing, the stationary members being spaced radially from the rotor axis so as to be substantially in alignment with the rotor blades mounted on the rotor such that the crop is cut between the rotor blades and the stationary members as the rotor blades are rotated past the stationary members;

the stationary members being positioned on one side only of the rotor such that an opposing side of the rotor blades opposite the stationary members remains exposed as the rotor blades are rotated past the stationary members.

20. The apparatus according to claim 19 wherein there is provided a guard member mounted across an inner side of the rotor, the guard member having a forward edge spaced rearwardly from a forward edge of the rotor, such that a forward portion of the inner side of the rotor remains exposed.

* * * * *